US008840963B2

(12) United States Patent
Kim

(10) Patent No.: US 8,840,963 B2
(45) Date of Patent: Sep. 23, 2014

(54) ENVIRONMENTALLY FRIENDLY WATER-BASED EPOXY RESIN COMPOSITION AND A USE THEREFOR

(75) Inventor: Sang Yang Kim, Seoul (KR)

(73) Assignee: Taesan Engineering Co., Ltd, Seoul (KR)

( * ) Notice: Subject to any disclaimer, the term of this patent is extended or adjusted under 35 U.S.C. 154(b) by 0 days.

(21) Appl. No.: 13/637,361

(22) PCT Filed: Apr. 27, 2011

(86) PCT No.: PCT/KR2011/003104
§ 371 (c)(1),
(2), (4) Date: Sep. 25, 2012

(87) PCT Pub. No.: WO2011/136568
PCT Pub. Date: Nov. 3, 2011

(65) Prior Publication Data
US 2013/0022748 A1     Jan. 24, 2013

(30) Foreign Application Priority Data

Apr. 29, 2010  (KR) .................. 10-2010-0040281

(51) Int. Cl.
| | | |
|---|---|---|
| B05D 7/00 | (2006.01) | |
| C09D 177/00 | (2006.01) | |
| B05D 7/16 | (2006.01) | |
| C08G 59/20 | (2006.01) | |
| C08L 63/00 | (2006.01) | |
| C09D 163/00 | (2006.01) | |

(52) U.S. Cl.
CPC ............... C09D 177/00 (2013.01); B05D 7/16 (2013.01); C08G 59/20 (2013.01); B05D 7/50 (2013.01); C08L 63/00 (2013.01); C08L 2201/56 (2013.01); C09D 163/00 (2013.01)
USPC ........ 427/386; 427/299; 427/327; 427/388.1; 427/388.4; 427/393.6

(58) Field of Classification Search
CPC combination set(s) only.
See application file for complete search history.

(56) References Cited

U.S. PATENT DOCUMENTS

| | | | | |
|---|---|---|---|---|
| 3,657,380 A | * | 4/1972 | Fang .............................. | 523/400 |
| 4,013,601 A | | 3/1977 | Alford | |
| 4,180,166 A | * | 12/1979 | Batdorf ......................... | 206/568 |
| 4,315,044 A | | 2/1982 | Elmore et al. | |
| 5,017,632 A | * | 5/1991 | Bredow et al. ................ | 523/400 |
| 5,162,060 A | * | 11/1992 | Bredow et al. ................ | 106/808 |
| 5,317,046 A | * | 5/1994 | Fonkalsrud ................... | 523/425 |
| 5,382,606 A | | 1/1995 | Butikofer | |
| 5,489,630 A | | 2/1996 | Walker | |
| 6,013,757 A | | 1/2000 | Corley et al. | |
| 6,225,376 B1 | * | 5/2001 | Klein et al. .................... | 523/404 |
| 6,404,068 B1 | * | 6/2002 | Tanaka et al. ................. | 257/787 |
| 6,500,912 B1 | | 12/2002 | Corley | |
| 7,605,195 B1 | * | 10/2009 | Ward et al. .................... | 523/400 |

FOREIGN PATENT DOCUMENTS

| | | |
|---|---|---|
| KR | 10-0925850 | 11/2006 |
| KR | 10-0829988 | 5/2008 |
| KR | 10-0559239 | 11/2009 |
| KR | 10-0952231 | 4/2010 |
| KR | 10-2009-0096193 | 4/2011 |
| WO | WO 2005/063880 | * 7/2005 |
| WO | WO 2008/147079 | * 12/2008 |

OTHER PUBLICATIONS

International Search Report for PCT/KR2011/003104 mailed Jan. 18, 2012.

* cited by examiner

*Primary Examiner* — Erma Cameron
(74) *Attorney, Agent, or Firm* — AKC Patents LLC; Aliki K. Collins

(57) ABSTRACT

The present invention relates to an aqueous epoxy resin composition which is able to contain a large amount of water because it uses an epoxy resin and a coagulant and thereby allows an emulsifier and water to be stably adsorbed and captured on tangled particle surfaces of the coagulant. The aqueous epoxy resin composition according to the present invention comprises a highly compatible formulation producing a good cross-linking bond in a curing reaction with a curing agent and hence it can effect functions including those of a coating agent, a primer agent, a mortar agent and an adhesive agent in a two-part formulation, and it entails a formulation using absolutely no volatile organic compounds in large amounts and hence it is environmentally-friendly and can also markedly reduce production costs.

20 Claims, No Drawings

ENVIRONMENTALLY FRIENDLY WATER-BASED EPOXY RESIN COMPOSITION AND A USE THEREFOR

RELATED APPLICATIONS

This application is a 371 application of International Application No. PCT/KR2011/003104, filed Apr. 27, 2011, which in turn claims priority from Korean Patent Application No. 10-2010-0040281, filed Apr. 29, 2010, each of which is incorporated herein by reference in its entirety.

TECHNICAL FIELD

The present invention relates to an environment-friendly aqueous epoxy resin composition, a method for coating or mortar-constructing a surface of concrete or metal using the same and a use thereof.

BACKGROUND ART

With the development of industrial society, a variety of structures have been constructed in a large amount, a demand to smooth a excellent function of synthetic resin with a coloration which protects them and is more concerned with its appearance is steadily increased. However, in order to prepare such a synthetic resin and facilitate its workability on the field, a large quantity of volatile organic materials should be necessarily utilized.

When preparing and utilizing the synthetic resin, the volatile materials used may destroy a natural environment, and harmful effects on a human body are increasing. Therefore, environment-friendly preparation technique capable of replacing this is urgently needed.

In checking an emulsion polymerization technique as a preparation example of such a synthetic resin, the following techniques are well known in the art: first, a technique of conducting an emulsion polymerization by nucleating an emulsifier swollen with monomer within a micelle; second, a technique of conducting a nucleation in an absorbed emulsifier layer; third, a technique of conducing a nucleation in an aqueous solution; and fourth, a technique of conducting a nucleation in a monomer.

The development using numerous emulsion polymerization techniques like this has actively been made, but an epoxy resin has a low solubility as an intermediate and thus it has a fundamental difficulty in using an emulsion polymerization. Furthermore, the epoxy resin has a greater problem in a curing reaction activation, a curing rate control, compatibility and the like at a normal temperature.

As a solution on the above problems, for example, Korean unexamined patent publication no. 10-2008-0078824 discloses a process for producing an epoxy silane oligomer wherein, during the reaction of epoxy resins and copolymerizable silanes in the presence of a catalyst, a water base containing an emulsifier is pre-hydrolyzed or pre-condensed and then reacted again with the epoxy. Korean unexamined patent publication no. 10-2009-0069419 discloses a process for preparing a water-soluble epoxy resin wherein the epoxy resin and polyethylene glycol are reacted to increase its solubility, thus making the water dispersability easy. Korean patent no. 10-0910983 discloses a method for coating the surface of metal by applying butyl acetate to an epoxy resin. Japanese patent no. 1974-0002066 discloses a process preparing epoxy resin emulsion curing agent which makes a surface crystallization easy in a high moisture environment. Swiss patent no. 1993-0021680 discloses a process for preparing a curing agent which makes compatibility with aqueous epoxy resin easy in a cement mortar.

The aqueous epoxy resin composition obtained from pre-hydrolysis and pre-condensation using polymer compounds which can react with epoxy and have a high solubility, without using epoxy alone, may still remain an organic solvent due to the manner of polymerizing it with organic solvent to extract a volatile material. Also, this may induce a high cost because an organic solvent is lost and the production procedure is complicated.

Further, measures concerning compatibility due to a gelling, an activation reaction and a catalyst of controlling a curing rate at low temperature are not sufficient. High boiling point solvents such as alcohols or ethyl or butyl acetates as an aqueous epoxy resin may cause a danger or hazard on a fire or human body and it includes an antifoaming agent or a leveling agent. Thus, when volatile materials are contained as an aqueous epoxy even in small amount, it is possible to weaken a cross-linkage with water. In the case of curing at normal temperature, the regular thickness is more than 0.2 mm. In the environment such as high moisture, it is difficult to obtain smooth curing properties. Additionally, the amount capable of containing water as an aqueous epoxy may be not sufficient to carry out the work.

Also, since the workability in an increase of viscosity which results from temperature reduction or long-term storage may be limited, the composition capable of adding water freely and then using it may be required. It is urgently necessary to develop the composition which may minimize an ill-smelling due to volatile organic materials and amine curing agents, and a disturbance due to ammonium gas occurred in the curing reaction.

On the other hand, the present inventors has disclosed Korean patent no. 10-093222 (mortar agent) and Korean patent no. 10-0925850 (coating agent) relating to an aqueous epoxy resin composition using epoxy. These patents suggest a process for using an aqueous epoxy resin composition by incorporating a coagulant in the epoxy resin and using only water and emulsifier. These patents also suggest that, for a mortar agent, a curing reaction rate of epoxy resin and a hydration reaction of cement in the cross-linkage induce loss of moisture due to an interaction. For a coating agent, swelling after emulsion polymerization leads to a shape with immobility, water and emulsifier are again used to weaken the viscosity, and the phased rate control in a curing reaction leads to a smooth curing property. However, for controlling a reaction rate at low temperature (0~5° C.) and lowering the workability according to an increase of viscosity, there was a limitation in that a desired amount of water as an aqueous epoxy resin may be freely post-added and used in a site work. Further, in an aqueous epoxy curing composition, there was need to further minimize ammonia gas which results from a curing reaction by removing a bad smell of amine.

DISCLOSURE OF THE INVENTION

Technical Problem

Thus, the present inventions have made extensive and intensive researches in order to resolve the above mentioned problems. As a result, after a coagulant is dispersed in an epoxy resin, the ideal balance of aliphatic reactive diluents and emulsifiers is maintained to thereby give a proper immobility by swelling only with water and emulsifier in an epoxy base resin. Further, the inventors have developed a technique of cross-adducting amine and polyamide in phases along with reactive diluents in the curing composition. According to the present invention, a method of first introducing water in a resin and allowing water to be stably adsorbed by coagulants or another method of dispersing coagulants in the curing components so as to stably absorb a large amount of water, can be used in combination.

As such, the subject to be accomplished by the present invention provides an environment-friendly aqueous epoxy resin composition. That is, the present composition can, upon preparation, contain 50% higher amount of water than a conventional aqueous epoxy resin composition, a water base containing a trace of emulsifier is post-added in a sufficiently large amount, preferably up to the maximum 1000 parts by weight with respect to 100 parts by weight of the aqueous epoxy resin composition to bring a smooth compatibility, and mixed with a hydration cement to bring excellent curing properties and it is possible to remove a bad smell of amine due to triple adducts.

Further, the present invention provides techniques of applying the above aqueous epoxy resin composition to various uses such as high strength cement mortar agents using gravels, sands and the like, in addition to coatings, mortar agents and adhesives.

Technical Solution

In order to accomplish the above object, the present invention provides an aqueous epoxy resin composition comprising:
(a) an epoxy resin component comprising 10 to 50% by weight of an epoxy resin, 1 to 25% by weight of a reactive diluent, 0.1 to 15% by weight of a coagulant, 1 to 20% by weight of an inorganic filler, 0.1 to 5% by weight of a promoter, 0.05 to 20% by weight of an emulsifier, and 10 to 85% by weight of a water; and
(a) a curing component comprising 5 to 50% by weight of a polyamide, 0.1 to 40% by weight of an amine compound, 0.05 to 20% by weight of an emulsifier, 0.1 to 10% by weight of a promoter, and 5 to 50% by weight of a water.

Also, the present invention provides an use of the above aqueous epoxy resin composition as an aqueous epoxy resin composition for a coating agent or a primer agent for coating a concrete surface or metal surface; an use of the aqueous epoxy resin composition as an aqueous epoxy resin composition for a mortar agent, and an use of the aqueous epoxy resin composition as aqueous epoxy resin adhesives.

Advantageous Effects

In the aqueous epoxy resin composition according to the present invention, the present composition can, upon preparation, contain 50% higher amount of water than a conventional aqueous epoxy composition; post-addition of water base which was impossible in a conventional technique is possible and thus even if a water base is post-added up to the maximum 1000 parts by weight with respect to 100 parts by weight of the aqueous epoxy resin composition to bring a smooth compatibility; a large amount of water can be quite freely used in a site work; and even volatile organic materials such as anti-foaming agents and leveling agents basically used in a conventional aqueous epoxy resin composition are never used and thus environment-friendly.

BEST MODE FOR CARRYING OUT THE INVENTION

The aqueous epoxy resin composition according to the present invention comprises:

(a) an epoxy resin component comprising 10 to 50% by weight of an epoxy resin, 1 to 25% by weight of a reactive diluent, 0.1 to 15% by weight of a coagulant, 1 to 20% by weight of an inorganic filler, 0.1 to 5% by weight of a promoter, 0.05 to 20% by weight of an emulsifier, and 10 to 85% by weight of a water; and
(b) a curing component comprising 5 to 50% by weight of a polyamide, 0.1 to 40% by weight of an amine compound, 0.05 to 20% by weight of an emulsifier, 0.1 to 10% by weight of a promoter, and 5 to 50% by weight of a water.

In the present invention, it is preferable to contain the first component, i.e., epoxy resin component, and the second component, i.e., curing component, in the amount of 100:5-200 parts by weight.

In the present invention, it is possible to further comprise 10 to 1000 parts by weight of water base consisting of emulsifiers, surfactants and water with respect to 100 parts by weight of the composition consisting of the epoxy resin component and the curing component.

In the present invention, the polyamide has preferably a weight average molecular weight of 1,000 to 5,000, and more preferably 1,000 to 4,000. When the weight average molecular weight of the polyamide is lower than the above range, the desired viscosity cannot be obtained and thus it is difficult to get the immobility. When the weight average molecular weight of the polyamide is higher than the above range, it is not easy to control a viscosity. Therefore, it is preferable to use polyamides having the above range. In the present invention, the polyamides having the above weight average molecular weight all can be used irrespective of the kinds thereof.

In the present invention, the amine compounds include, but are not limited to, one or more selected from the group consisting of polyoxypropylene diamine, triethylene tetramine, diethylene triamine, isophorone diamine, metaxylene diamine, metaphenylene diamine, dimethyl amine, diamino diphenyl sulfone amine, diethylene aminopropyl amine and menthane dimine. Preferably, polyoxypropylene diamine is used. The amine compounds may further comprise one or more selected from the group consisting of triethylene tetramine, diethylene triamine, isophorone diamine, metaxylene diamine, metaphenylene diamine, dimethyl amine, diamino diphenyl sulfone amine, diethylene aminopropyl amine and menthane diamine.

The present invention further provides an aqueous epoxy resin composition for a coating agent or a primer agent for coating a surface of concrete comprising 100 parts by weight of the aqueous epoxy resin composition according to the present invention and 5 to 500 parts by weight of cement.

The present invention further provides an aqueous epoxy resin composition for a coating agent or a primer agent for coating a metal surface comprising 100 parts by weight of the epoxy resin composition and 5 to 500 parts by weight of metal powders. The metal powders used in the present invention are, but are not limited to, one or more selected from the group consisting of powders of zinc, aluminum, manganese, cadmium, nickel, magnesium, tin and its alloy; oxidized powder of its alloy, and iron-alloy.

In the metal coating composition, hydrogen gas is occurred by mixing zinc powders and thus, there may be a problem upon sealing or storage in a package. In this regard, it is preferable to make a composition in a pre-emulsion polymerization state wherein water is not mixed in a main material or curing component and to post-add water or add zinc powder in a field work.

The present invention further provides an aqueous epoxy resin composition for a mortar agent comprising 100 parts by weight of the epoxy resin composition according to the present invention, 50 to 500 parts by weight of cement mixtures, and 100 to 1000 parts by weight of silica sand.

In the present invention, the cement mixture may comprise 10 to 30% by weight of a cement powder, 40 to 80% by weight of an alumina cement powder, and 5 to 30% by weight of calcium hydroxide.

The aqueous epoxy resin composition for a mortar agent according to the present invention may comprise 100 parts by weight of the epoxy resin composition, and 500 to 50000 parts by weight of Remicon (ready mixed concrete) including water, cement, sand, pebble, crushed stone and the like.

The present invention further provides an aqueous epoxy resin composition for adhesives comprising 100 parts by weight of the aqueous epoxy resin composition according to the present invention, and 5 to 500 parts by weight of inorganic fillers. As the inorganic fillers, those generally known in the art can be used without limitation. Specifically, the inorganic fillers used include one or more selected from the group consisting of calcium carbonate, talc, calcium carbonate, silica and dolomite.

The present invention provides a process for coating a surface of concrete comprising removing and finishing an irregularity or laitance of the surface of concrete; and applying the aqueous epoxy resin composition for a coating agent or a primer agent according to the present invention to the surface of concrete.

The process for coating a surface of concrete according to the present invention may further comprise applying the aqueous epoxy resin coating or primer composition for coating a surface of concrete, and then applying the same composition through intermediate coat or top coat.

The present invention further provides a process for coating a surface of metal comprising removing and finishing a rust or irregularity on the surface of metal; and then applying thereto the aqueous epoxy resin composition for a coating agent or a primer agent according to the present invention to the surface of metal.

The process for coating a surface of metal according to the present invention may further comprise applying the aqueous epoxy resin composition for a primer agent for coating the surface of metal, and then applying thereto the same composition through intermediate coat or top coat.

The present invention provides a process for mortar-constructing a surface of concrete comprising removing and finishing an irregularity or laitance of the surface of concrete; and then applying the aqueous epoxy resin composition for a coating agent or a primer agent according to the present invention to the surface of concrete.

The present invention provides a process for mortar-constructing a surface of concrete comprising applying the aqueous epoxy resin composition for a coating agent or a primer agent according to the present invention to the surface of concrete, and then coating thereto the same composition through press finishing, intermediate coat and top coat.

The epoxy resin composition prepared thus is a composition of maximizing an activation and compatibility even in the present of water. Although water base containing a trace of emulsifier is mixed again to 100 parts by weight of mixture of a main component and a curing agent, the compatibility is good and it is possible to remove up to a bad smell of amine due to triple adduct effects by means of a cross-circulation of curing agent.

The aqueous epoxy resin composition according to the present invention can be variably used as a primer agent, a coating agent, a mortar agent, and an aqueous epoxy resin adhesive and the like in coating and mortar-constructing a concrete surface. The present composition may have a good curing property in respective uses. However, in the case of the aqueous epoxy resin adhesives, a composition not including water in a curing component can be used.

Hereinafter, the present invention is described in more detail.

As the epoxy resins in the present invention, the epoxy resins usually used in the art can be used. These may include conventional epoxy resins, epoxy resins including chlorine, novolac epoxy resin, brominated epoxy resin or mixtures thereof. Also, in addition to acryl, polyurethane, fiber reinforced plastic (FRP), latex, vinyl and melamine resins, one or more materials usually used in the art such as copolymerizable or modifiable polymer resin and the compounds thereof can be mixed and used.

Commercial examples of the epoxy resin include R1475, KEM-128M, KEM-128-70, KEM-134-60, EM-101-50, KEM-172-60, KEM-019-50, H-23, H-4121, H-4148-3, KH-700, KH-701 and the like.

In the present invention, the reactive diluents include mono-epoxy, di-epoxy, tri-epoxy, for example, but are not limited to, one or more selected from the group consisting of n-butylglycidyl ether, aliphatic glycidyl ether, 2-ethylhexylglycidyl ether, phenylglycidyl ether, o-cresylglycidyl ether, nonylphenylglycidyl ether, p-tert-butylphenylglycidyl ether, 1.4-buthanediolgycidyl ether, 1.6-hexanedioldiglycidyl ether, neophentylglycidyl ether, 1.4-cyclohexane dimethyloldiglycidyl ether, polypropylene glycoldiglycidyl ether, ethylene glycoldiglycidyl ether, polyethylene glycoldiglycidyl ether, diethylene glycoldiglycidyl ether, resorcinol diglycidyl ether, hydrogenated bisphenol A glycidyl ether, trimethylolpropene triglycidyl ether, glycerolpolyglycidyl ether, diglycerol polyglycidyl ether, pentaerythritolpolyglycidyl ether, castoil glycidyl ether, sorbitolpolyglycidyl ether, neodecanoic acid glycidyl ester, diglycidyl-1.2-cyclohexane dicarboxylate, digylcidyl-o-phthalate, n,n-diglycidyl amine, n,n-diglycidyl-o-toluidiene, triglycidyl-p-aminophenol, tetraglycidyl-diaminodiphenyl methane, triglycidyl-isocyanate, 1.4-buthandioldiglycidyl ether, 1.6-hexane dioldiglycidyl ether, polyproplyeneglycidyldiglycidyl ether and triethylolpropene triglycidyl ether, In the present invention, the coagulants include, but are not limited to, one or more selected from the group consisting of silicone dioxides, aerosols, bentonites, nanoparticles, silica nanoparticles, white carbons, silicates and glass powders.

In the present invention, the inorganic filler includes preferably, but not limited to, one or more selected from the group consisting of powders such as calcium carbonate, talc, calcium bicarbonate, ceramic, clay, silica and dolomite.

In the present invention, the promoters include, but are not limited to, one or more selected from the group consisting of phenol, nonylphenol, tertiary amine, mercaptan, dibutyltindiacetate, stennous octoate, dibutyltindilaurate, monobutyltinoxide, monobutyltinchloride dihydroxide, buthyltintri(2-ethylhexanate), dibutyltinmellite, potassium octoate, bismuthtri-2-ethylhexanate, benzyltriethylammonium chloride, 60-copper complex compound, Ni—Al complex, A-399 and the like.

In the present invention, the emulsifier used may include one or more reactive or non-reactive emulsifier selected from the group consisting of a copolymer of polyoxyethylene and polyoxypropylene, a copolymer of polyoxyethylene and polyoctylphenyl ether, and sodium dodecylbenzenesulfide. Adeka NE-10, SE-10N, etc., commercially available, can be used. In addition, the emulsifiers include, but are not limited to, one or more selected from the group consisting of alkylphenol, surfactants, cationic surfactants, anionic surfactants, and polyether siloxane base surfactants.

The water used in the present invention includes, but is not limited to, water generally used, such as distilled water, tap water, meteoric ground water, rust water, soft water and hard water.

The aqueous epoxy resin composition according to the present invention may include, in addition to the above components, additives such as drying agents, flame retardants and antifoaming agents which are usually used in the art. The drying agents used herein include, but are not limited to, calcium oxide, copper sulfate and phosphorus pentoxide. The flame retardants used herein include, but are not limited to, pentabromodiphenyl oxide, decabromodiphenyl oxide and the like. The antifoaming agents include, but are not limited to, polysiloxane non-water based emulsion type, plasticizers, antistatic agents and antioxidants.

The compositions for a coating agent, a mortar agent and a primer agent for coating a surface of concrete according to the present invention is prepared by incorporating cement in the aqueous epoxy resin composition according to the present invention.

In the present invention, as the cement, those usually used in the art can be used without limitation. Specific examples thereof include one or more selected from the group consisting of Portland cement, air setting cement, hydraulic cement, acid-proof cement, moderate heat cement, high early strength cement, low-heat cement, sulfuric resistant cement, blast furnace slag cement, fly ash cement, Portland pozzolan (silica) cement, white cement, expansive vermiculite cement, expansive hydraulic cement, masonry cement, super-high-early strength cement, ultra rapid hardening cement, mortar cement and oil well cement.

The aqueous epoxy resin composition for a coating agent or a primer agent for coating a surface of concrete according to the present invention further comprises 0.1 to 30 parts by weight of pigment components, with respect to 100 parts by weight of the epoxy resin composition according to the present invention, to thereby give a desired color.

The aqueous epoxy resin composition for a coating agent or a primer agent for coating a surface of metal according to the present invention further comprises 0.1 to 30 parts by weight of pigment components, with respect to 100 parts by weight of the epoxy resin composition according to the present invention to give a desired color.

The process for coating a surface of concrete according to the present invention comprises removing and finishing an irregularity or laitance of the surface of concrete; and applying the aqueous epoxy resin composition for a coating agent or a primer agent according to the present invention to the surface of concrete. The present process further comprise applying the aqueous epoxy resin composition for a coating agent or a primer agent with a thickness of about 0.2 mm/one time on the surface of concrete, curing them and then applying thereto the same composition through intermediate coat or top coat.

The process for coating a surface of metal according to the present invention comprises removing and finishing a rust or irregularity on the surface of metal; and applying the aqueous epoxy resin composition for a coating agent or a primer agent according to the present invention to the surface of metal. The present process further comprise applying the aqueous epoxy resin composition for a coating agent or a primer agent with a coating thickness of about 0.2 mm/one time on the surface of metal, curing them and then applying the same composition through intermediate coat or top coat.

The process for mortar-constructing a surface of concrete according to the present invention comprises removing and finishing an irregularity or laitance of the surface of concrete; and applying the aqueous epoxy resin composition for a primer agent or a mortar agent to the surface of concrete together with primer agents and mortar agents with a thickness of 3 to 100 mm, press-finishing and then curing the resulting compositions, applying thereto the cured compositions consecutively through intermediate coat and top coat.

Depending on the use purpose or in the case of adhesive composition, the composition except for emulsifier and water in the curing component may be included.

In the curing component according to the present invention, it is possible to use an epoxy-containing adduct product in addition to amine compound and polyamide which include one or more compound selected from the group consisting of polyoxypropylene diamine, triethylene tetramine, diethylene triamine, isophorone diamine, metaxylene diamine, metaphenylene diamine, dimethyl amine, diamino diphenyl sulfone amine, diethylene aminopropyl amine and menthane dimine. To the adduct product, one or more selected from the group consisting of catalysts (e.g., dibuthyltindiacetate, stennous octoate, dibuthyltindilaurate, monobuthyltinoxide, monobuthyltinchloride dihydroxide, buthyltintri(2-ehtylhexanate), dibuthyltinmellite, patassium octoate, bismuthtri-2-ethylhexanate), ammonia salts, copper compounds, nickel, and aluminum compounds are mixed or copolymerized or adducted with epoxy resin. The copolymer or adduct obtained thus can be used.

Also, it is possible to mix one or more selected from tetrahydro phthalic anhydride, hexahydro phthalic anhydride, phthalic anhydride, neidic methyl anhydride, trimellitic anhydride, hexachloro endomethylene tetrahydrophthalic anhydride, fibromellitic di anhydride, benzophenone tetracarboxylic anhydride, dimethylaminomethyl phenol, benzyl di methyl amine which include aliphatic acid anhydride or to use adduct added with an epoxy resin. It is also possible to mix with adduct of polyamines or to again use monomer, dimer, trimer epoxy resin or pure epoxy resin to make adduct. Further, it is possible to mix one or more selected from metaxylene diamine, triethylenetetramine and diethylenetriamine with one or more selected from the above polyamide, amine, acid anhydride, and potent dicyandiamide and imidazole. Alternatively, it is possible to mix one or more selected from dibuthyltindiacetate, stennous octoate, dibuthyltindilaurate, monobuthyltinoxide, monobuthyltinchloridedihydroxide, buthyltintri(2-ethylhexanate), dibuthyltinmellite, patassium octoate, ammonium salt of bismuthtri-2-ethylhexanate, copper compound, nickel, and aluminum catalyst, or to copolymerize or adduct with monomer, dimer, trimer or epoxy resin.

In the present invention, the promoters of the curing components include, but are not limited to, one or more selected from the group consisting of phenol, nonylphenol, tertiary amine, mercaptan, dibuthyltindiacetate, stennous octoate, dibuthyltindilaurate, monobuthyltinoxide, monobuthyltinchloridedihydroxide, buthyltintri(2-ethylhexanate), dibuthyltinmellite, patassium octoate, bismuthtri-2-ethylhexanate, benzyltriethylammonium chloride, 60-copper complex compound, Ni—Al complex, A-399 and the like.

The aqueous epoxy resin composition of the present invention is used as coating agents, mortar agents, and adhesives, and is a liquid phase having a proper immobility when constructing as a coating agent and a primer agent for the surface of concrete or metal. It consists of water base which can be post-added up to 10-1000 parts by weight, preferably up to 100-300 parts by weight after 100 parts by weight of basic resin component and 5-50 parts by weight are mixed with a curing component mixed in a field and a curing agent. It is a mortar agent and a primer agent for mortar-constructing the surface of concrete wherein 100 parts by weight of basic resin component and 5-50 parts by weight of a curing component mixed in a field and then water base is added up to 10-500 parts by weight. As compared with a conventional resin composition, the epoxy resin composition of the present invention exhibits excellent compatibility, stability, workability, water resisting property, and chemical resisting property, and it is possible to subject to a fast process handling with the aqueous primer composition because controlling a curing rate is easy. This is a phenomenon having middle or low glutinosity weight-reduced with adhesives used in various coating surfaces, and comprises 10-100 parts by weight of a curing component mixed in a field with respect to 100 parts by weight of a basic resin. This epoxy resin composition exhibits excellent workability, stability and mechanical properties and it is possible to subject to a fast process handling.

The composition of the present invention is a resin composition comprising reactive diluents, coagulants, emulsifiers, water, water resisting agent, color base, curing agent, curing promoter and the like in an epoxy resin wherein the resin component maintains a complete immobility by swelling under a low viscosity condition. Such composition can be used as a mortar agent for coating, a primer agent for mortar construction, or mortar agent by post-adding emulsifier-containing water according to the use in a field and then mixing with cement, silica sand, pebble and the like. In the case of a coating agent for the surface of metal, zinc or other metal is principally added upon preparation, but when the particle size is thick and the precipitation inducing property is high, it can be post-added and used in a field.

In the epoxy resin composition of the present invention, when the coagulants such as aerosol are included in the epoxy resin and emulsifier-containing water is mixed in a state maintaining a proper temperature, emulsion polymerization is occurred. Water and emulsifier are stably absorbed and captured on tangled particle surface of the coagulants without a dissolving material. Thus, oligomer, polymer and radical are get together to make the termination reaction. Thereby the swelling is occurred and the property is immobile. The emulsion polymerization due to the coagulant is broadly and stably conducted in the inner and external surfaces of particles. Even after a curing agent is introduced, a large amount of water can be contained. The free radical of oligomers is very hydrophilic. As the curing agent, amine and polyamide are circulated, cross-linked and adducted with monomer, dimer, trimer fatty acids. The interaction between an unsaturated fatty acid of polyamide and a coagulant having thixotropy leads to an increase in adsorption energy and a stabilization of compatibility. Thereby, after mixing with a resin component, a large amount of water base containing emulsifiers can be mixed and used. Furthermore, due to triple circulation adduct, a peculiar bad smell of amine can be minimized.

The epoxy resin composition obtained thus can maximize an activation and compatibility even in the presence of water. To 100 parts by weight of the mixture of main components and curing agents, the water base containing a trace of emulsifier is mixed in an amount of up to 300 parts by weight to thereby exhibit a smooth compatibility, and a bad smell of amine can be minimized with triple adducts in the circulation cross-linking manner of the curing agent.

Construction with composition according to the use as primer agents, coating agents, mortar agents and adhesives in coating and mortar-constructing the surface of concrete using the aqueous epoxy resin composition of the present invention, may lead to a good curing property.

The aqueous epoxy resin composition of the present invention is constructed according to the use thereof to exhibit an excellent mechanical property, and also can greatly comply with the demand such as pollution-free of industry and cleaning of work. Also, handling is easy, working environment is safe, there is no danger of fire, and working environment is not polluted. Therefore, it is clear that the aqueous epoxy resin composition of the present invention is environment-friendly.

Hereinafter, the present invention is described by way of examples, but the scope of the invention is not limited thereto.

EXAMPLES

Preparation of an Aqueous Epoxy Resin and Curing Agent Composition

1. Preparation of an Epoxy Based Resin Component

TABLE 1

| Constitution | Weight (g) |
| --- | --- |
| Epoxy resin[1] | 45.00 |
| Reactive diluents[2] | 6.00 |
| Coagulant[3] | 1.10 |
| Inorganic filler[4] | 2.50 |
| Promoter[5] | 0.30 |
| Emulsifier[6] | 0.10 |
| Water | 45.00 |
| Total | 100.00 |

2. Preparation of a Curing Component

TABLE 2

| Constitution | Weight (g) |
| --- | --- |
| Curing agent 1[7] | 16.00 |
| Curing agent 2[8] | 45.00 |
| Curing agent 3[9] | 5.00 |
| Promoter[10] | 5.00 |
| Emulsifier[6] | 5.00 |
| Water | 24 |
| Total | 100.00 |

3. Combination of Portland Cement

TABLE 3

| Constitution | Weight (g) |
| --- | --- |
| Cement powder | 20.00 |
| Alumina cement powder | 75.00 |
| Calcium hydroxide curing agent | 5.00 |
| Total | 100.00 |

In the site work, the above composition was combined, However, 100 parts by weight of water base containing emulsifiers was added to 100 parts by weight of a mixture of resin component: curing component=100:25 and again mixed. The primer agent mixed with 100 parts by weight of Portland cement was applied to the surface of concrete wherein the floor was finalized to conduct a coating construction. After a primer agent was cured, intermediate coat and top coat added with 100 parts by weight of water base were conducted step-by-step and cured to form a regular thin film.

To the above composition, 100 parts by weight of water base containing emulsifiers was added to 100 parts by weight of a mixture with resin component:curing component=100:25 mixed with zinc and aluminum, and again mixed and applied to the surface of concrete wherein the floor was finalized to conduct a metal coating.

Also, 100 parts by weight of water base containing emulsifier was added to 100 parts by weight of a mixture with resin component: curing component=100:22 and then mixed. The primer agent mixed with 100 parts by weight of Portland cement was applied to the surface of concrete wherein the floor was finalized. At the same time 50 parts by weight of water base containing emulsifier was added to 100 parts by weight of a mixture with resin component: curing component=100:33 and then mixed. 100 parts by weight of Portland cement and 400 parts by weight of silica sand were mixed, pressed, finished, cured and then conducted through intermediate coat and top coat.

Further, for the above composition wherein resin component: curing component=100:25 or inorganic fillers were mixed and finished as adhesives, they have been set to a weight ratio of the resin component:the curing component=100:50 and mixed to conduct an adhesive force test for stone and metal wood.

The chemical components and sources of the actual products used in the composition as above are summarized as follows:
 (1) Epoxy resin: Copolymer of epichlorohydrin and bisphenol (KOOKDO Chemical)
 (2) Reactive diluents: 3 functional epoxy glycidyl ether
 (3) Coagulant: Silicone dioxide (Aerosol)
 (4) Inorganic filler: Talc
 (5) Promoter: Phenol
 (6) Emulsifier: Polyoxyethlyene and polyoxypropylene block copolymer,
 (7) Curing agent 1: Polyoxy propylene diamine
 (8) Curing agent 2: Polyamide (weight average molecular weight 2800)
 (9) Curing agent 3: Triethylene tetraamine
 (10) Promoter: Phenol promoter (A-399)
Performance Evaluation for Coating Agent The concrete and metal samples were finished on their surfaces and then mixed as above to which were applied a primer agent under the normal temperature 25° C. and same condition. After 8 hours, the top coat was again applied and cured for 16 hours to determine the physical properties thereof.

As the result of the determination, concrete exhibited an adhesive force of 40.2 kgf/cm$^2$, a compressive strength of 600-700 kgf/cm$^2$ and a tensile strength of 120-150 kgf/cm$^2$. Also, for the chemical resistance test, petri dish was attached to the surface of cured surface layer so that solution could not be discharged. The solutions were then injected by a syringe, respectively, and kept for 30 days. As the result of visual test, abnormalities such as surface discoloration were not presented in calcium chloride solution, 10% calcium hydroxide solution, sulfuric acid solution and the like.

The results of determination of metal surface property and chemical resistance were identical with the concrete surface property and chemical resistance. The adhesive force was 34-37 kgf/cm$^2$. Therefore, stable physical property could be secured even in a situation wherein curing agent was mixed and about 50% of water base was added.
Performance Evaluation for Mortar Agent The concrete samples were finished on their surfaces and then mixed as above. A primer agent was applied to the mixture on which mortar agent was laid and press-finished or rolled by a honeycomb roller to thereby obtain a flat surface. The thickness of applied primer was set to 0.5 mm and the thickness of pressed and rolled mortar was set to about 5 mm.

The curing process was conducted at normal temperature 20° C. for about 16 hours to determine the physical properties thereof.

The result of the determination shows an adhesive force (bonding force) of 42.2 kgf/cm$^2$, a compressive strength of 900-1100 kgf/cm$^2$, a tensile strength of 450-490 kgf/cm$^2$., a wear resistance of 'no abnormality' (wheel tracking of 5000 times, 80 kgf, 70±2° C.). Also, for the chemical resistance test, petri dish was attached to the surface of cured mortar layer so that solution could not be discharged. The solutions were then injected by a syringe, respectively, and kept for 30 days. As the result of visual test, abnormalities such as surface discoloration were not found in calcium chloride solution, 10% calcium hydroxide solution, PH sulfuric acid solution and the like.

From the above results, the epoxy resin composition prepared according to the present invention was very useful even if coating of primer agents was conducted concurrently with laying of mortar agents. By a finishing or rolling method, the shape was not lost and the surface had no void, thereby giving a flat surface. Thereby, due to shortened process, the construction is easy, and maintaining the high strength function, reducing the cost, and environment-friendly constructing were possible.
Performance Evaluation for Adhesives For the composition wherein a ratio of the resin component and curing component was 100:25, but inorganic filler was mixed and finished with adhesives, the resin component and curing component were mixed at a ratio of 100:50 to meet the equivalent. For the stone and wood, the test standard (KS M 3734, KSF 3101) has shown an adhesive force of 42-45 kgf/cm$^2$ and tensile strength of 150-200 kgf/cm$^2$.

From the above results, it has been confirmed that the aqueous epoxy resin composition prepared according to the present invention is adhesives wherein usability of stone, metal, wood and the like is convenient. Due to cost reduction and solventless water-based property, environment-friendly construction was possible.

INDUSTRIAL APPLICABILITY

Accordingly, the aqueous epoxy resin composition according to the present invention is very useful in conducting the construction process with a coating agent, a primer agent, a mortar agent, and a primer agent by adding the curing agent and then adding water base containing emulsifier thereto. Further, convenience of work, uniformity and physical properties after curing are excellent. Reducing the costs, not using volatile materials and removing up to a bad smell with circulation cross-linking adduct are possible. Therefore, environment-friendly construction can be made to thereby more increase the efficiency and productivity.

What is claimed is:
1. An aqueous epoxy resin composition comprising:
 (a) an epoxy resin component comprising 10 to 50% by weight of an epoxy resin, 1 to 25% by weight of a reactive diluent, 0.1 to 15% by weight of a coagulant, 1 to 20% by weight of an inorganic filler, 0.1 to 5% by weight of a promoter, 0.05 to 20% by weight of an emulsifier, and 10 to 85% by weight of a water; and
 (b) a curing component comprising 5 to 50% by weight of a polyamide, 0.1 to 40% by weight of an amine com- pound, 0.05 to 20% by weight of an emulsifier, 0.1 to 10% by weight of a promoter, and 5 to 50% by weight of a water;

further comprising 10 to 1000 parts by weight of a water base consisting of emulsifier, surfactant and water with respect to 100 parts by weight of the composition mixed with the epoxy resin component and the curing component; and wherein the polyamide has a weight average molecular weight of 1,000 to 5,000 MW.

2. The aqueous epoxy resin composition of claim 1, wherein the curing component is contained in an amount of 5 to 200 parts by weight with respect to the 100 parts by weight of the epoxy resin component.

3. The aqueous epoxy resin composition of claim 1, wherein the reactive diluents include one or more selected from the group consisting of n-butyl glycidyl ether, aliphatic glycidyl ether, 2-ethylhexylglycidyl ether, phenyl glycidyl ether, o-cresylglycidyl ether, nonylphenylglycidyl ether, p-tert-butylphenylglycidyl ether, neophentylglycidyl ether, 1,4-cyclohexane dimethyloldiglycidyl ether, polypropylene glycoldiglycidyl ether, ethyleneglycoldiglycidyl ether, polyethylene glycoldiglycidyl ether, diethylene glycoldiglycidyl ether, resorcinol diglycidyl ether, hydrogenated bisphenol A glycidyl ether, trimethylolpropenetriglycidyl ether, glycerolpolyglycidyl ether, diglycerol polyglycidyl ether, pentaerythritolpolyglycidyl ether, castoil glycidyl ether, serbitolpolyglycidyl ether, neodecanoic acid glycidyl ester, diglycidyl-1.2-cyclohexane dicarboxylate, digylcidyl-o-phthalate, n,n-diglycidyl amine, n,n-diglycidyl-o-toluidiene, triglycidyl-p-aminophenol, tetraglycidyl-diaminodiphenyl methane, triglydicyl-isocyanate, 1,4-buthandioldiglycidyl ether, 1,6-hexane dioldiglycidyl ether, polypropyleneglycidyldiglycidyl ether and triethylolpropentriglycidyl ether.

4. The aqueous epoxy resin composition of claim 1, wherein the coagulant includes one or more selected from the group consisting of silicone dioxide, bentonite nanoparticle, silica nanoparticle, silicate and glass powder.

5. The aqueous epoxy resin composition of claim 1, wherein the inorganic filler includes one or more selected from the group consisting of calcium carbonate, talc, calcium bicarbonate, ceramic, clay, silica and dolomite.

6. The aqueous epoxy resin composition of claim 1, wherein the promoter includes one or more selected from the group consisting of phenol, nonylphenol, tertiary amine, dibutyltindiacetate, stennous octoate, dibutyltindilaurate, monobutyltinoxide, monobutyltinchloride dihydroxide, butyltintri(2-ethylhexanate), dibutyltinmellite, poatassium octoate, bismuthtri-2-ethylhexanate and benzyltriethylammonium chloride.

7. The aqueous epoxy resin composition of claim 1, wherein the emulsifier includes one or more selected from the group consisting of a copolymer of polyoxyethylene and polyoxypropylene, a copolymer of polyoxyethylene and polyoctylphenyl ether, and sodium dodecylbenzenesulfide.

8. The aqueous epoxy resin composition of claim 1, wherein the amine compound includes one or more selected from the group consisting of polyoxypropylene diamine, triethylene tetramine, diethylene triamine, isophorone diamine, metaxylene diamine, metaphenylene diamine, dimethyl amine, diamino diphenyl sulfone amine, diethylene aminopropyl amine and menthane dimine.

9. An aqueous epoxy resin composition for a coating agent or a primer agent for coating a surface of concrete comprising 100 parts by weight of the epoxy resin composition according to claim 1, and 5 to 500 parts by weight of cement.

10. The aqueous epoxy resin composition for a coating agent or a primer agent for coating a surface of concrete according to claim 9, wherein the cement includes one or more selected from the group consisting of Portland cement, air setting cement, hydraulic cement, acid-proof cement, sulfuric resistant cement, blast furnace slag cement, fly ash cement, Portland pozzolan (silica) cement, white cement, expansive vermiculite cement, expansive hydraulic cement, masonry cement, hardening cement, mortar cement and oil well cement.

11. An aqueous epoxy resin composition for a coating agent or a primer agent for coating a surface of metal comprising 100 parts by weight of the aqueous epoxy resin composition according to claim 1, and 5 to 500 parts by weight of a metal powder.

12. The aqueous epoxy resin composition for a coating agent or a primer agent for coating a surface of metal according to claim 11, wherein the metal powder comprises one or more selected from the group consisting of powders of zinc, aluminum, manganese, cadmium, nickel, magnesium, tin, alloys, oxidized powders of the tin alloy, and iron-alloys.

13. An aqueous epoxy resin composition for a mortar agent comprising 100 parts by weight of the aqueous epoxy resin composition according to claim 1, and 50 to 500 parts by weight of cement mixture and 100 to 1000 parts by weight of a silica sand.

14. The aqueous epoxy resin composition for a mortar agent according to claim 13, wherein the cement mixture comprises 10 to 30% by weight of a cement powder, 40 to 80% by weight of an alumina cement powder, and 5 to 30% by weight of calcium hydroxide.

15. An aqueous epoxy resin composition for adhesives comprising 100 parts by weight of the aqueous epoxy resin composition according to claim 1, and 5 to 500 parts by weight of inorganic filler.

16. A process for coating a surface of concrete comprising removing and finishing an irregularity or laitance of the surface of concrete; and then applying thereto the aqueous epoxy resin composition for a coating agent or a primer agent according to claim 9 to the surface of concrete.

17. A process for coating a surface of concrete according to claim 16, further comprising applying the aqueous epoxy resin composition for a coating agent or a primer agent to a surface of concrete as a bottom layer coating, and then applying the same composition as a middle layer coating on the bottom layer coating, and finally the same composition as a top coating on the middle layer coating.

18. A process for coating a surface of metal comprising removing and finishing a rust or irregularity on the surface of metal; and then applying thereto the aqueous epoxy resin composition for a coating agent or a primer agent according to claim 11 to the surface of metal.

19. A process for coating a surface of metal according to claim 18, further comprising applying the aqueous epoxy resin composition for a coating agent or a primer agent to a surface of metal as a bottom layer coating, and then applying the same composition as a middle layer coating on the bottom layer coating, and finally the same composition as a top coating on the middle layer coating.

20. A process for mortar-constructing a surface of concrete comprising removing and finishing an irregularity or laitance of the surface of concrete; and then applying thereto the aqueous epoxy resin composition for a mortar agent according to claim 13 to the surface of concrete.

* * * * *